(12) United States Patent
Ishikawa et al.

(10) Patent No.: US 6,308,692 B1
(45) Date of Patent: Oct. 30, 2001

(54) FUEL VAPOR RECOVERY APPARATUS

(75) Inventors: Takashi Ishikawa, Okazaki; Tomoyasu Arase, Toyota, both of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/542,770

(22) Filed: Apr. 4, 2000

(30) Foreign Application Priority Data

Apr. 12, 1999 (JP) .................................................. 11-104105

(51) Int. Cl.[7] .................................................. F02M 33/02
(52) U.S. Cl. .......................................... 123/519; 123/516
(58) Field of Search ................................ 123/519, 518, 123/520, 516; 220/4.14, 905

(56) References Cited

U.S. PATENT DOCUMENTS

| | | | |
|---|---|---|---|
| 3,617,034 | * 11/1971 | Skinner | 123/516 |
| 3,977,379 | * 8/1976 | Weissenbach | 123/516 |
| 5,056,493 | * 10/1991 | Holzer | 123/518 |
| 5,460,135 | * 10/1995 | Ohashi et al. | 123/516 |
| 5,596,971 | * 1/1997 | Kidokoro | 123/516 |
| 5,746,185 | * 5/1998 | Kidokoro et al. | 123/516 |
| 6,176,118 | * 1/2001 | Kidokoro et al. | 73/40 |

FOREIGN PATENT DOCUMENTS

HEI 4-362264   12/1992   (JP) .

* cited by examiner

*Primary Examiner*—Henry O. Yuen
*Assistant Examiner*—Mahmoud Gimie
(74) *Attorney, Agent, or Firm*—Kenyon & Kenyon

(57) ABSTRACT

A fuel vapor recovery apparatus has a canister for adsorbing fuel vapor generated in a fuel chamber formed in a fuel tank. A fuel vapor inlet of the canister is connected to the fuel chamber. A fuel vapor outlet of the canister is connected to an intake passage of an internal combustion engine. Fuel vapor adsorbed by the canister is purged therefrom into the intake passage. An air vent of the canister is connected to an air chamber that has a predetermined capacity.

7 Claims, 4 Drawing Sheets

FUEL VAPOR
CONCENTRATION

FUEL VAPOR
CONCENTRATION

FUEL VAPOR RECOVERY APPARATUS

INCORPORATION BY REFERENCE

The disclosure of Japanese Patent Application No. HEI 11-104105 filed on Apr. 12, 1999 including the specification, drawings and abstract is incorporated herein by reference in its entirety.

BACKGROUND OF THE INVENTION

1. Field of the Invention

The present invention relates to a fuel vapor recovery apparatus.

2. Description of the Related Art

In order to facilitate level shifts of the fuel liquid surface in a fuel tank in accordance with changes in the amount of fuel present in the fuel tank, there is a need to open the internal space of the fuel tank to the atmosphere. However, since fuel vapor normally occurs in fuel tanks, a fuel tank connected in open communication to the atmosphere allows fuel vapor to be easily emitted into the atmosphere. To solve this problem, Japanese Patent Application Laid-Open No. HEI 8-197968 proposes an apparatus in which a canister for adsorbing fuel vapor from a fuel tank is provided in a communication path between the fuel tank and the atmosphere.

The amount of fuel vapor that such a canister is able to adsorb is limited. If the fuel vapor adsorption limit is exceeded, fuel vapor passes through the canister and flows out into the atmosphere.

Therefore, the aforementioned laid-open application (HEI 8-197968) proposes a construction in which the canister is connected to an intake passage of an internal combustion engine. During operation of the engine, fuel vapor is released from the canister into the engine intake passage so that the fuel vapor adsorption limit of the canister will not be exceeded.

However, if a large amount of fuel vapor is generated in the fuel tank, or if fuel vapor adsorbed by the canister is not released into the internal combustion engine for a long time, fuel vapor passes through the canister and flows out into the atmosphere.

SUMMARY OF THE INVENTION

Accordingly, it is an object of the invention to prevent emission of fuel vapor into the atmosphere.

A fuel vapor recovery apparatus in accordance with the invention includes a canister for adsorbing fuel vapor generated in a fuel chamber formed in a fuel tank, wherein a fuel vapor inlet of the canister is connected to the fuel chamber and a fuel vapor outlet of the canister is connected to an intake passage of an internal combustion engine so that fuel vapor adsorbed by the canister is allowed to be purged therefrom into the intake passage. An air opening of the canister is connected to an air chamber that has a predetermined capacity. In the thus-constructed apparatus, fuel vapor flows into the air chamber having the predetermined capacity, when the amount of fuel vapor in the canister exceeds the amount of fuel vapor that can be adsorbed by the canister.

An internal space of the fuel tank may be divided into the fuel chamber and the air chamber by a partition.

The partition may be deformable so that a capacity of the fuel chamber changes corresponding to a change in an amount of fuel present in the fuel chamber.

The fuel vapor recovery apparatus may further include a valve that is provided between the air chamber and atmosphere and that opens when the air chamber has a predetermined pressure.

The air chamber may be connected to the intake passage.

The air chamber may be open to an atmosphere via a second canister that is provided for adsorbing fuel vapor.

BRIEF DESCRIPTION OF THE DRAWINGS

The foregoing and further objects, features and advantages of the present invention will become apparent from the following description of a preferred embodiment with reference to the accompanying drawings, wherein like numerals are used to represent like elements and wherein.

DETAILED DESCRIPTION OF PREFERRED EMBODIMENT

Figure 1:
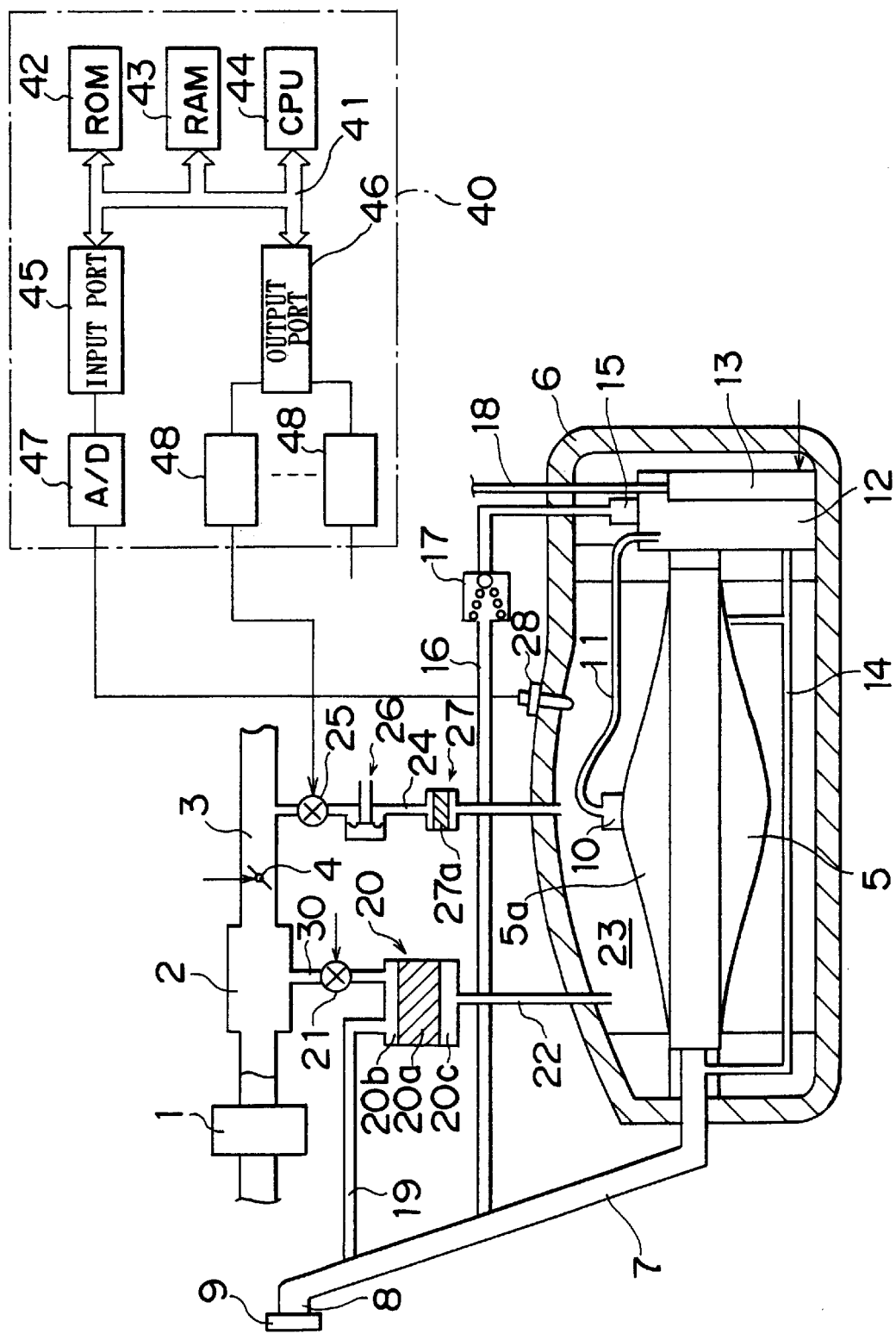
FIG. 1 is an illustration of an internal combustion engine equipped with a fuel vapor recovery apparatus according to the invention.

FIG. 1 illustrates an internal combustion engine equipped with a preferred embodiment of the fuel vapor recovery apparatus of the invention. An engine 1 is connected to an intake passage 3 via a surge tank 2. A throttle valve 4 that is driven by a step motor (not shown) is disposed in the intake passage 3.

A fuel tank 5 is contained in a housing 6. A detail description of the fuel tank 5 will be given below. The fuel tank 5 is connected to a filler opening 8 by a fuel-supplying passage 7. The filler opening 8 is closed by a filler cap 9. A fuel vapor passage 11 is connected to an upper wall 5a of the fuel tank 5 via a float-type shutoff valve 10. The shutoff valve 10 closes the fuel vapor passage 11 by using a float (not shown) when a fuel liquid surface in the fuel tank 5 rises to the shutoff valve 10. Therefore, when the fuel liquid surface does not reach the shutoff valve 10, that is, when fuel vapor exists above the fuel liquid surface, fuel vapor is let out into the fuel vapor passage 11. When the entire amount of fuel vapor is discharged from above the fuel liquid surface into the fuel vapor passage 11, the shutoff valve 10 closes, so that fuel vapor or air is not allowed to flow from the fuel vapor passage 11 into the fuel tank 5. The thus-closed shutoff valve 10 also prevents fuel vapor or air from flowing from the fuel tank 5 into the fuel vapor passage 11. As shown in FIG. 1, the fuel vapor passage 11 is connected to a fuel pump chamber 12. Furthermore, the fuel vapor pipe 11 is flexible in the housing 6 so as to allow the upper wall 5a of the fuel tank 5 to easily move within the housing 6.

The fuel pump chamber 12 is disposed inside the housing 6. A fuel pump 13 is disposed in the fuel pump chamber 12.

The fuel pump 13 draws fuel from the fuel tank 5 into the fuel pump chamber 12 via a fuel take-up passage 14. The fuel take-up passage 14 connects the fuel pump chamber 12 to the fuel-supplying passage 7 at a site near the fuel tank 5 and to a bottom portion of the fuel tank 5.

An upper space of the fuel pump chamber 12 is connected to a fuel vapor passage 16 via a float-type shutoff valve 15. The shutoff valve 15 closes the fuel vapor passage 16 by using a float (not shown) when a fuel liquid surface in the fuel pump chamber 12 rises to the shutoff valve 15. Therefore, when the fuel liquid surface does not reach the shutoff valve 15, that is, when fuel vapor exists above the fuel liquid surface in the fuel pump chamber 12, fuel vapor is let out into the fuel vapor passage 16. When the entire amount of fuel vapor is discharged from above the fuel liquid surface into the fuel vapor passage 16, the shutoff valve 15 closes, so that fuel vapor or air is not allowed to flow from the fuel vapor passage 16 into the fuel pump chamber 12. The thus-closed shutoff valve 15 also prevents fuel vapor or air from flowing from the fuel tank 5 into the fuel vapor passage 16. The fuel vapor passage 16 is connected to the fuel-supplying passage 7 at a site near the filler opening 8. The fuel vapor passage 16 is provided with a check valve 17. The check valve 17 opens when the pressure in a portion of the fuel vapor passage 16 extending toward the fuel pump chamber 12 is greater than the pressure in a portion of the fuel vapor passage 16 extending toward the filler opening 8 by at least a predetermined value.

The fuel pump 13 is connected to one or more fuel injection valves (not shown) by a fuel injection passage 18.

The fuel-supplying passage 7 is connected at a portion thereof near the filler opening 8 to the surge tank 2 via a fuel vapor passage 19. The fuel vapor passage 19, extending from the fuel-supplying passage 7, is connected to a fuel vapor inlet of a canister 20 that is provided for temporarily adsorbing fuel vapor. A fuel vapor outlet of the canister 20 is connected to the surge tank 2 by a purge passage 30 that is provided for purging fuel vapor from the canister 20 to the surge tank 2. The canister 20 has activated carbon 20a. Amounts of fuel vapor, including fuel vapor adsorbed to the activated carbon 20a of the canister 20 and fuel vapor present in a portion of the fuel-supplying passage 7 located near the filler opening 8, are drawn into the surge tank 2 by negative pressures generated in the surge tank 2. The purge passage 30 is provided with a purge valve 21 that is opened when a purge is needed.

The canister 20 has an air vent that is formed on a side of the canister 20 that is remote from the fuel vapor inlet and the fuel vapor outlet. The air vent is connected, via a connecting pipe 22, to an air chamber 23 that is formed in the tank housing 6. The air chamber 23 is connected to a portion of the intake passage 3 that extends upstream of the throttle valve 4, via a connecting pipe 24 that is provided separately from the connecting pipe 22. In this embodiment, the surge tank 2 forms a portion of the intake passage 3.

The connecting pipe 24 is provided with a shutoff valve 25 that remains open in a normal condition. The connecting pipe 24 further has a release valve 26. When the pressure in a portion of the connecting pipe 24 that extends to the air chamber 23 reaches or exceeds a predetermined value, for example, a positive pressure, the release valve 26 opens to release the pressure from the connecting pipe 24. When fuel is charged into the fuel tank 5, the release valve 26 is opened to release air from the air chamber 23. A trap filter 27 for temporarily adsorbing fuel vapor is disposed in a portion of the connecting pipe 24 that extends from the release valve 26 toward the air chamber 23. Activated carbon 27a for adsorbing fuel vapor is disposed in the trap filter 27.

A pressure sensor 28 for detecting pressure in the air chamber 23 is disposed on an upper wall of the housing 6.

An electronic control unit 40 is formed by a digital computer, including a read-only memory (ROM) 42, a random access memory (RAM) 43, a central processing unit (CPU) 44, an input port 45 and an output port 46 that are interconnected by a bidirectional bus 41. An output voltage from the pressure sensor 28 is inputted to the input port 45 via an A/D converter 47. The output port 46 of the electronic control unit 40 is connected to the throttle valve 4, the fuel pump 13, the purge valve 21 and the connecting pipe shutoff valve 25, via corresponding drive circuits 48.

Figure 2:
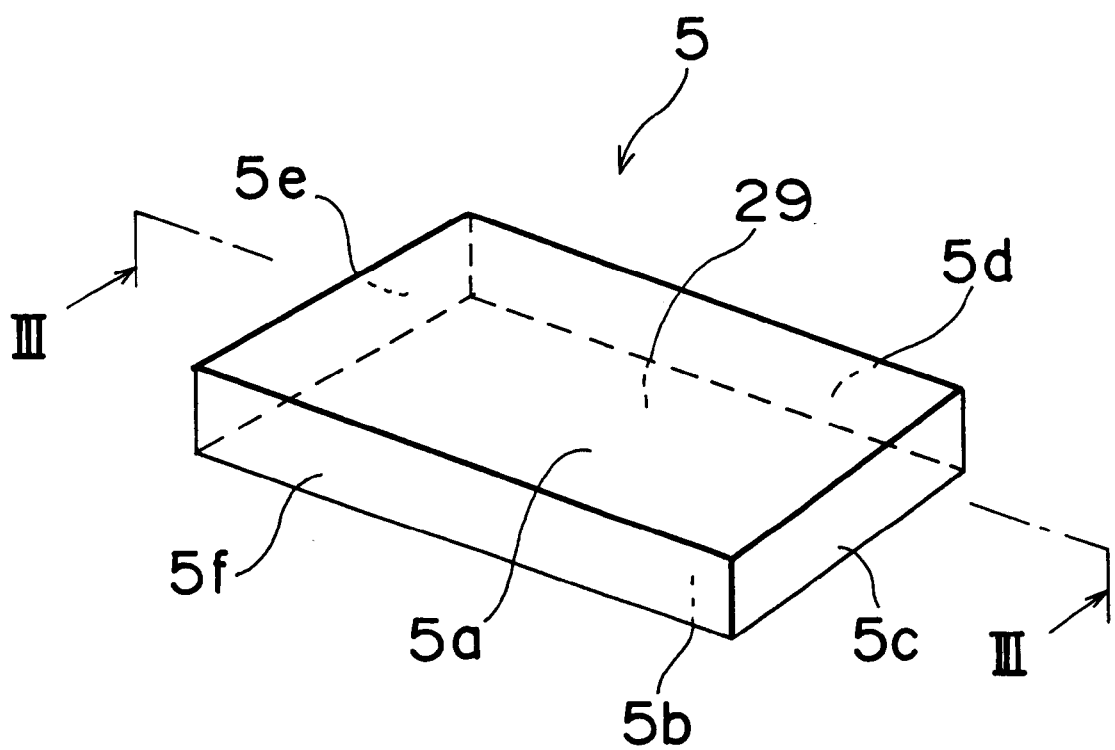
FIG. 2 is a perspective view of a fuel tank.

The fuel tank according to this embodiment will now be described in detail with reference to FIGS. 2 to 4. The fuel tank 5 has the generally rectangular upper wall 5a, a generally rectangular lower wall 5b, and four generally rectangular side walls 5c–5f that connect the four sides of the upper wall 5a to the corresponding sides of the lower wall 5b. Thus, the upper wall 5a, the lower wall 5b and the side walls 5c–5f form a fuel-storing space or a fuel chamber 29 for storing fuel within the fuel tank 5. A fuel tank according to this invention includes a fuel tank that has generally polygonal upper and lower walls, and generally rectangular side walls that connect the sides of the polygonal upper wall to the corresponding sides of the polygonal lower wall.

Figure 3A:
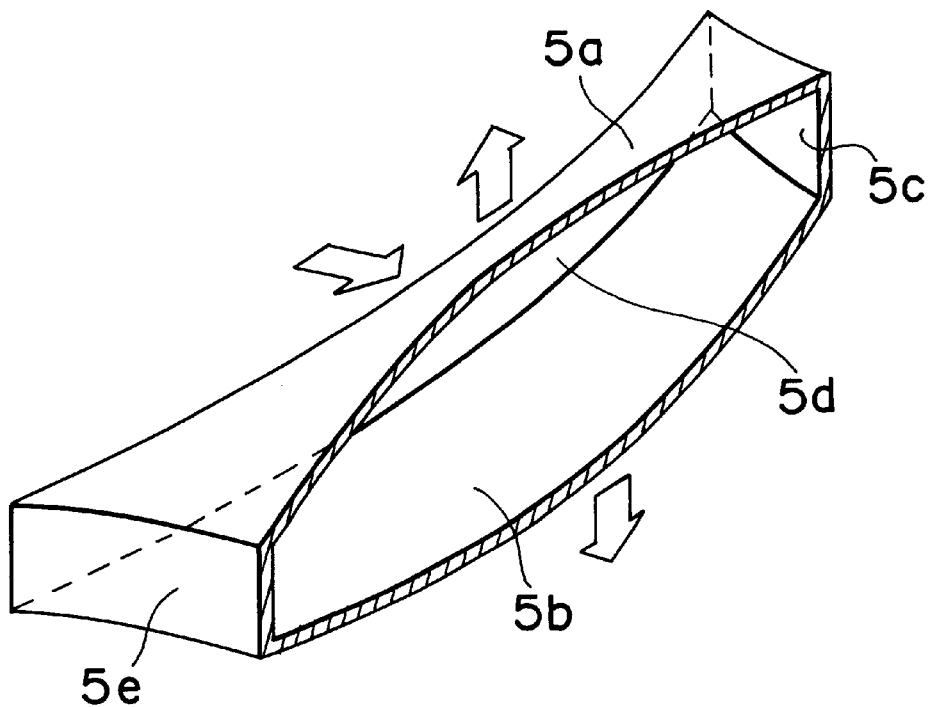
FIG. 3A is a sectional view of the fuel tank taken on a plane III—III indicated in FIG. 2, wherein the amount of fuel stored in a fuel chamber of the fuel tank is greater than a reference value.
Figure 3B:
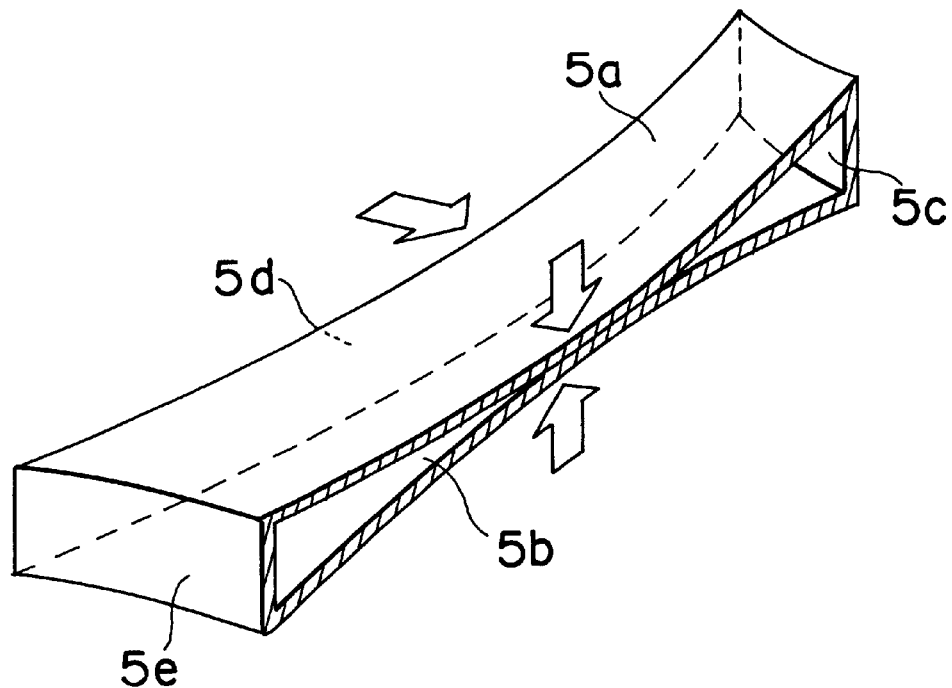
FIG. 3B is a sectional view of the fuel tank taken on a plane III—III indicated in FIG. 2, wherein the amount of fuel stored in the fuel chamber is less than the reference value.

The upper wall 5a, the lower wall 5b and the side walls 5c–5f are each formed from a flexible material. Therefore, the upper wall 5a, the lower wall 5b and the side walls 5c–5f deform in accordance with changes in the amount of fuel stored in the fuel chamber 29. More specifically, when the amount of fuel stored in the fuel chamber 29 exceeds a reference amount that is determined as a maximum amount of fuel that can be stored in the fuel chamber 29 when the fuel tank 5 retains a generally rectangular parallelepiped shape as shown in FIG. 2, the upper wall 5a and the lower wall 5b expand outwards so as to move apart from each other, and the side walls 5c–5f sink inwards so as to move closer to one another, as indicated in FIG. 3A. When the amount of fuel stored in the fuel chamber 29 becomes less than the reference amount, the upper wall 5a and the lower wall 5b sink inwards so as to move closer to each other, and the side walls 5c–5f expand outwards so as to move apart from one another, as indicated in FIG. 3B. Thus, the capacity of the fuel chamber 29 of the fuel tank 5 changes in accordance with the amount of fuel stored in the fuel chamber 29,thereby preventing formation of a space above the fuel liquid surface in the fuel chamber 29. Therefore, generation of fuel vapor in the fuel chamber 29 is prevented.

Next described will be a fuel vapor managing method employed by the fuel vapor recovery apparatus of this embodiment. In this embodiment, fuel vapor occurs in the fuel-supplying passage 7. Although generation of fuel vapor in the fuel tank 5 is substantially prevented as described above, there still is a possibility of occurrence of fuel vapor in the fuel tank 5 in some cases (e.g., a case where the amount of fuel stored in the fuel tank 5 is small). There also exists a possibility of occurrence of fuel vapor in the fuel pump chamber 12. In the embodiment, therefore, there is a need for fuel vapor recovery that prevents emission of fuel vapor into the atmosphere. In this embodiment, fuel vapor generated in the fuel-supplying passage 7, the fuel tank 5 or the fuel pump chamber 12 is temporarily adsorbed by the canister 20 and, during operation of the engine, fuel vapor is released from the canister 20, and is introduced into the engine 1 together with intake air. In this manner, the embodiment prevents emission of fuel vapor into the atmosphere.

In this embodiment, fuel vapor generated in the fuel tank 5 flows out into the fuel pump chamber 12 via the float-type shutoff valve 10 and the fuel vapor passage 11. Fuel vapor from the fuel pump chamber 12, including the fuel vapor introduced from the fuel tank 5 into the fuel pump chamber 12 and the fuel vapor generated in the fuel pump chamber 12, flows into the fuel-supplying passage 7 via the float-type shutoff valve 15, the check valve 17 and the fuel vapor passage 16. Fuel vapor, including the fuel vapor introduced from the fuel pump chamber 12 into the fuel-supplying passage 7 and the fuel vapor occurring in the fuel-supplying passage 7, flows out of the fuel-supplying passage 7 into the canister 20 via the fuel vapor passage 19, and adsorbs to the activated carbon 20a of the canister 20. When the engine system is not in operation, or when the engine system is not in a condition that permits the introduction of fuel vapor into the engine 1, the purge valve 21 is closed to prevent fuel vapor from being emitted into the atmosphere via the purge passage 30, the surge tank 2 and the intake passage 3.

The amount of fuel vapor that can be adsorbed by the canister 20 is limited. In this embodiment, an amount of fuel vapor that cannot be adsorbed by the canister 20 flows out into the air chamber 23 in the tank housing 6 via the connecting pipe 22 since the canister 20 is connected in communication to the air chamber 23 via the connecting pipe 22. The embodiment thus prevents the amount of fuel vapor that cannot be adsorbed by the canister 20 from being emitted into the atmosphere. Particularly in the case of the fuel tank 5 of this embodiment, the walls of the fuel tank 5 are deformable to change the capacity of the fuel tank 5 in accordance with changes in the amount of fuel stored therein, so that a space that allows the deformation of the tank walls is needed. This space can be utilized as the air chamber 23. Furthermore, the air chamber 23 has a far greater capacity than the canister 20, so that a considerable amount of fuel vapor can be stored in the air chamber 23.

However, the amount of fuel vapor that can be stored in the air chamber 23 is also limited. Therefore, it is necessary to cope with the fuel vapor stored in the air chamber 23 and the canister 20 before the amount of fuel vapor in the air chamber 23 reaches the limit. In this embodiment, the purge valve 21 and the shutoff valve 25 are opened when the operation of the engine system is in a condition where the introduction of fuel vapor into the engine 1 can be permitted. During operation of the engine system, the pressure in the surge tank 2 is negative, whereas the pressure in the portion of the intake passage 3 extending upstream of the throttle valve 4 is atmospheric. Therefore, air flows from the portion of the intake passage 3 extending upstream of the throttle valve 4 into the air chamber 23 via the connecting pipe 24. Furthermore, air flows from the air chamber 23 into the canister 20 via the connecting pipe 22, and flows from the canister 20 into the surge tank 2 via the purge passage 30. When air flows from the portion of the intake passage 3 extending upstream of the throttle valve 4 into the surge tank 2 in that manner, fuel vapor is purged from the trap filter 27, the air chamber 23 and the canister 20 into the surge tank 2. Thus, the amount of fuel vapor in the air chamber 23 is prevented from exceeding the limit.

Figure 4A:
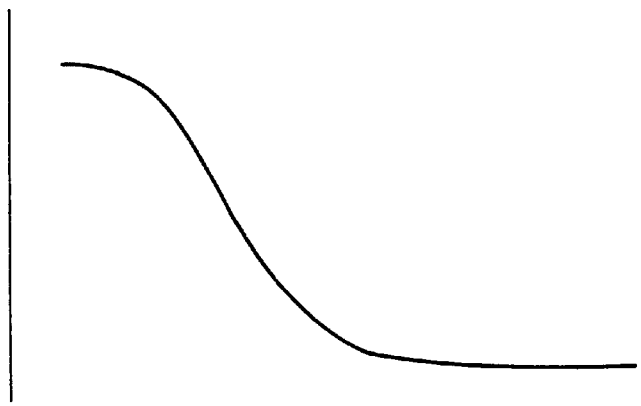
FIG. 4A is a graph indicating the fuel vapor concentration during purging in an apparatus employing an enlarged canister.
Figure 4B:
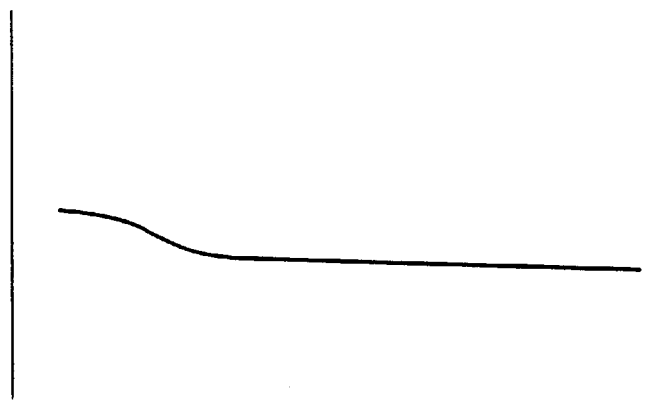
FIG. 4B is a graph indicating the fuel vapor concentration during purging in the apparatus of the embodiment employing a canister.

To precisely control the air-fuel ratio of a mixture supplied into the engine 1, it is preferable that the concentration of fuel vapor purged into the surge tank 2 be substantially constant. From this viewpoint, the fuel vapor recovery apparatus of this embodiment, combining the canister 20 and the air chamber 23 to increase the fuel vapor-storing capacity, is advantageous over a fuel vapor recovery apparatus that simply employs a canister that is enlarged to increase the fuel vapor-storing capacity. More specifically, in the apparatus simply employing the enlarged canister, the fuel vapor concentration becomes very high in an early stage of purging and then gradually decreases as indicated in FIG. 4A. In the fuel vapor recovery apparatus of this embodiment, the fuel vapor concentration becomes slightly high in an early stage of purging due to the fuel vapor purged from the canister 20, but the fuel vapor concentration in that stage is lower than that in the apparatus employing the enlarged canister, as can be seen from FIG. 4B. After the early stage of purging, the fuel vapor concentration in the apparatus of the embodiment becomes substantially constant because the amount of fuel vapor stored in the canister 20 decreases and, at the same time, fuel vapor introduced from the air chamber 23 into the canister 20 is purged therefrom.

Furthermore, in the embodiment, fuel passes through the walls of the fuel tank 5, so that fuel vapor occurs in the air chamber 23. However, fuel vapor is purged from the air chamber 23 by air streams as described above. Thus, connecting the air chamber 23 to the surge tank 2 is advantageous.

In this embodiment, during purging, the pressure in the space above the fuel liquid surface in the fuel-supplying passage 7 and the pressure in the air chamber 23 are substantially equal to a negative pressure. This is preferable from a viewpoint of preventing fuel liquid from flowing into the fuel vapor passages 16, 19 and a viewpoint of accurately measuring the amount of fuel stored in the fuel tank 5. If the connecting pipe 22 were not connected to the air chamber 23 but opened directly to the atmosphere, negative pressure would occur in the space above the fuel liquid surface in the fuel-supplying passage 7 but not in the air chamber 23, so that the fuel liquid surface in the fuel-supplying passage 7 would rise to the fuel vapor passage 16 or 19 and fuel liquid would flow into the fuel vapor passage 16 or 19. In the embodiment, since substantially equal negative pressures occur in the space above the fuel liquid surface in the fuel-supplying passage 7 and in the air chamber 23, the fuel liquid surface in the fuel-supplying passage 7 does not rise. The embodiment thus prevents fuel liquid from flowing into the fuel vapor passage 16 or 19.

In this embodiment, the amount of fuel stored in the fuel tank 5 is determined by using a fuel gauge that is disposed in the fuel pump chamber 12 and taking into account the position of the upper wall 5a of the fuel tank 5 and the pressure acting on the upper wall 5a. If the connecting pipe 22 were not connected to the air chamber 23 but opened directly to the atmosphere, negative pressure would occur in the space above the fuel liquid surface in the fuel-supplying passage 7 but not in the air chamber 23, so that the fuel liquid surface in the fuel-supplying passage 7 would rise to the fuel vapor passage 16 or 19, as stated above. With rise of the fuel liquid surface, the upper wall 5a of the fuel tank 5 would descend. In the embodiment, the fuel liquid surface in the fuel-supplying passage 7 does not rise and, therefore, the upper wall 5a of the fuel tank 5 does not descend in that manner. Therefore, the amount of fuel stored in the fuel tank 5 can be accurately calculated on the basis of the position of the upper wall 5a of the fuel tank 5.

If fuel vapor liquefies and dwells in a fuel vapor passage, the pass area of the fuel vapor passage reduces, so that an adverse effect will result. Therefore, in the embodiment, the fuel vapor passage 11, which is connected to the fuel tank 5, is not directly connected to the canister 20 or the fuel-supplying passage 7, but is indirectly connected thereto via the fuel pump chamber 12. Due to this indirect connection of the fuel tank 5 to the fuel-supplying passage 7, fuel vapor is likely to liquefy, if any does, in the fuel pump chamber 12 when fuel vapor flows from the fuel tank 5 into the fuel pump chamber 12 via the fuel vapor passage 11. Thus, the possibility of fuel vapor liquefying in a portion of the fuel vapor passage 11 that extends downstream of the fuel pump chamber 12 is correspondingly reduced.

Fuel vapor accumulates in the air chamber 23, starting in a lower portion thereof. Therefore, in order to purge fuel vapor from the air chamber 23 as early as possible, it is preferable to connect the connecting pipe 22 to a bottom wall of the housing 6. However, an optimal connecting position of the connecting pipe 22 to the housing 6 may be selected, taking into consideration other factors as well, for example, the flow of air within the air chamber 23, the layout of the fuel tank 5, and the like.

In the embodiment, the housing 6 has a tightly closed construction. The tightly closed construction of the housing 6 will prevent fuel from leaking out of the housing 6 if fuel should leak from the fuel tank 5.

Although in the embodiment, the space within the housing 6, excluding the fuel tank 5, is utilized as the air chamber 23, it is also possible to form a separate space with a predetermined capacity and use it as an air chamber.

The shutoff valve 25 normally remains open as described above. When a hole leakage test is to be performed in the system, the shutoff valve 25 is closed to maintain a constant negative pressure in the system. By detecting pressure fluctuation during the test, a leaking hole can be detected. During the hole leakage test, a negative pressure occurs uniformly in the fuel-supplying passage 7, the air chamber 23 and the like in the system, so that the fuel liquid surface in the fuel tank 5 will not rise in the manner described above. During this occasion, the purge valve 21 is also closed. Therefore, when fuel is supplied into the fuel tank 5 during a stop of the operation of the engine system, the pressure in the air chamber 23 increases. An increased pressure in the air chamber 23 will make it difficult to supply fuel into the fuel tank 5. In the embodiment, however, when the pressure in the air chamber 23 exceeds a predetermined pressure, the release valve 26 opens. Thus, the embodiment ensures that fuel can easily be supplied into the fuel tank 5 at any time. Furthermore, when a pressure is released from the air chamber 23 by the release valve 26 opening, air or gas from the air chamber 23 passes through the trap filter 27, so that fuel vapor from the air chamber 23 will not be emitted to the atmosphere.

While the present invention has been described with reference to what is presently considered to be a preferred embodiment thereof, it is to be understood that the invention is not limited to the disclosed embodiment or constructions. To the contrary, the invention is intended to cover various modifications and equivalent arrangements.

What is claimed is:

1. A fuel vapor recovery apparatus comprising:
    a fuel tank forming a fuel chamber therein;
    a canister for adsorbing fuel vapor generated in the fuel chamber, the canister including a fuel vapor inlet, a fuel vapor outlet and an air opening;
    a purge passage extending from the fuel chamber to the fuel vapor inlet and from the fuel vapor outlet to an intake passage of an internal combustion engine, the purge passage allowing the fuel vapor to be purged from the canister into the intake passage; and
    an air chamber connected to the air opening, wherein the air chamber is provided separately from the canister.

2. A fuel vapor recovery apparatus according to claim 1, wherein the fuel tank includes a partition therein which divides the fuel tank to form the air chamber and the fuel chamber.

3. A fuel vapor recovery apparatus according to claim 2, wherein the partition is deformable so that a capacity of the fuel chamber corresponds to a change in an amount of fuel present in the fuel chamber.

4. A fuel vapor recovery apparatus according to claim 2, further comprising a valve provided between the air chamber and atmosphere, wherein the valve opens when a pressure in the air chamber is a predetermined pressure.

5. A fuel vapor recovery apparatus according to claim 1, wherein the air chamber is connected to the intake passage.

6. A fuel vapor recovery apparatus according to claim 1, further comprising a second canister for adsorbing fuel vapor, wherein the air chamber is open to atmosphere via the second canister.

7. The fuel vapor recovery apparatus of claim 1, wherein the air chamber is provided within the fuel tank.

* * * * *